US008660551B2

(12) United States Patent
Dwight et al.

(10) Patent No.: US 8,660,551 B2
(45) Date of Patent: Feb. 25, 2014

(54) LOOK-AHEAD CAPABILITY DETERMINATION VIA DEVICE PROFILES

(75) Inventors: Timothy M. Dwight, Richardson, TX (US); Paul T. Schultz, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 397 days.

(21) Appl. No.: 12/632,408

(22) Filed: Dec. 7, 2009

(65) Prior Publication Data

US 2011/0136483 A1 Jun. 9, 2011

(51) Int. Cl.
*H04W 4/00* (2009.01)
(52) U.S. Cl.
USPC .......... 455/422.1; 455/414.4; 455/432.2; 455/432.3; 370/254; 709/231
(58) Field of Classification Search
USPC ............ 455/422.1, 432.2, 432.3, 560, 414.4; 370/254, 338; 709/230, 231
See application file for complete search history.

(56) References Cited

U.S. PATENT DOCUMENTS

| 2002/0142749 | A1 | 10/2002 | Muniere et al. | |
|---|---|---|---|---|
| 2003/0210663 | A1 | 11/2003 | Everson et al. | |
| 2006/0251005 | A1 | 11/2006 | Foster | |
| 2006/0253538 | A1* | 11/2006 | Jung et al. | 709/206 |
| 2006/0256748 | A1* | 11/2006 | Jung et al. | 370/328 |
| 2007/0189275 | A1* | 8/2007 | Neff | 370/352 |
| 2008/0081648 | A1 | 4/2008 | Kang et al. | |
| 2008/0270618 | A1 | 10/2008 | Rosenberg | |
| 2009/0006533 | A1* | 1/2009 | Guo | 709/203 |
| 2009/0097475 | A1* | 4/2009 | Seon | 370/352 |
| 2010/0223348 | A1* | 9/2010 | Przybysz et al. | 709/206 |

* cited by examiner

*Primary Examiner* — Marcos Torres

(57) ABSTRACT

A network device may receive a call request message. The call request message may include information identifying a user to which the call is destined. The network device may further retrieve, using the information identifying the user, information identifying a device with which the user is associated. In addition, the network device may retrieve, using the information identifying the device, a first list of codecs that the device is willing to support, and establish the call to the device using a codec from the first list of codecs.

21 Claims, 14 Drawing Sheets

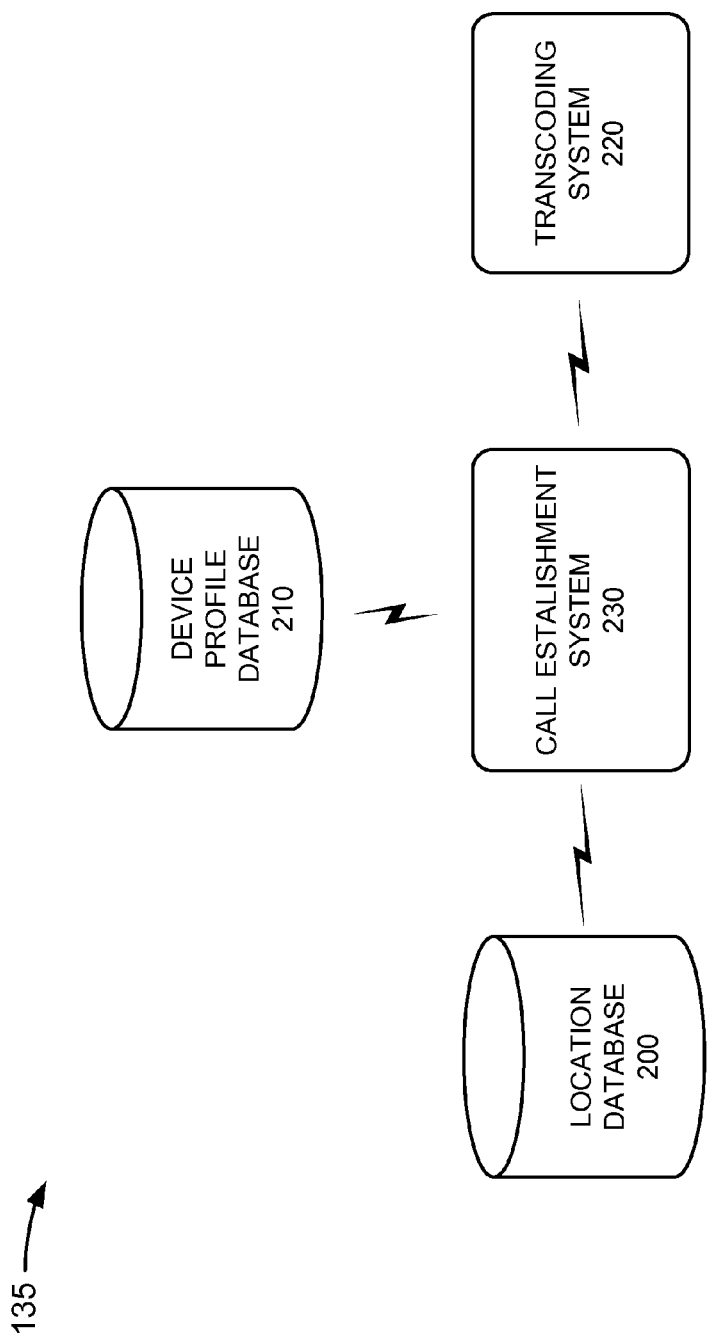

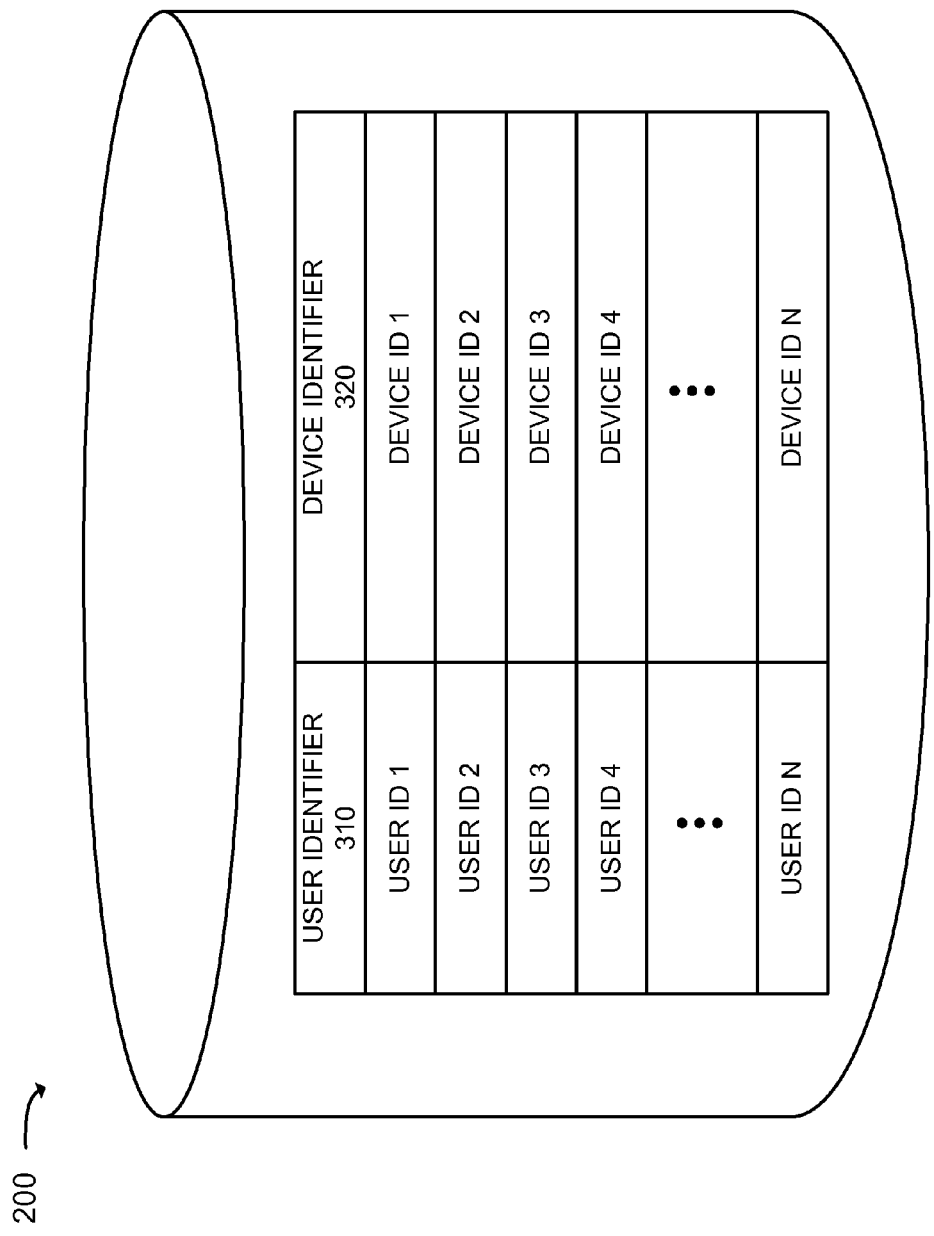

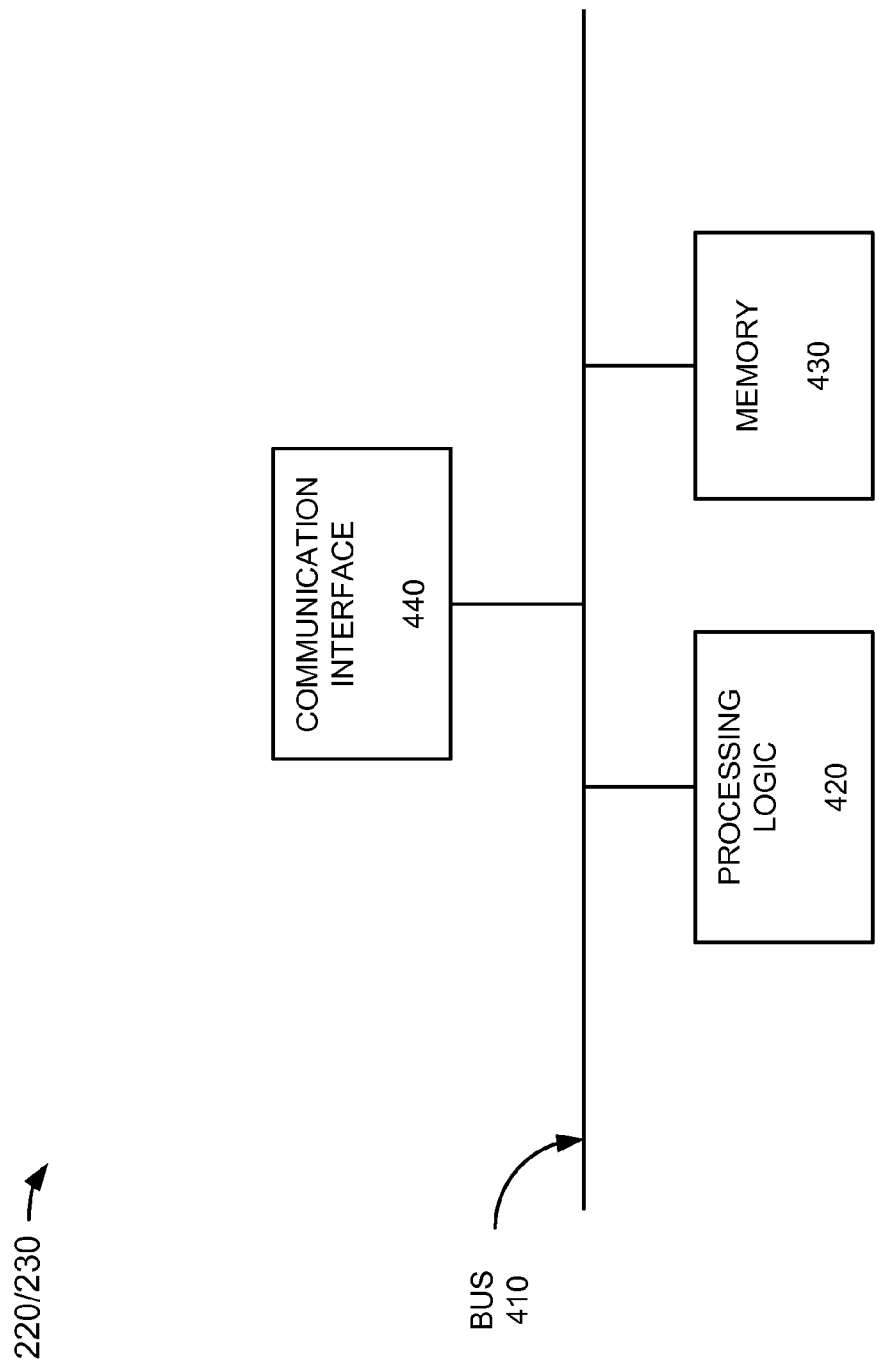

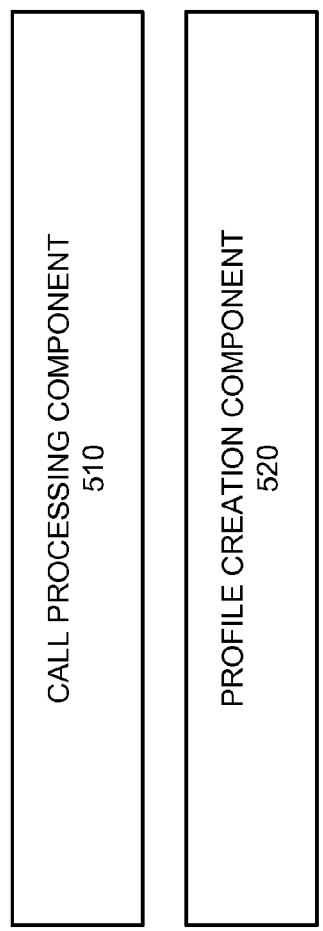

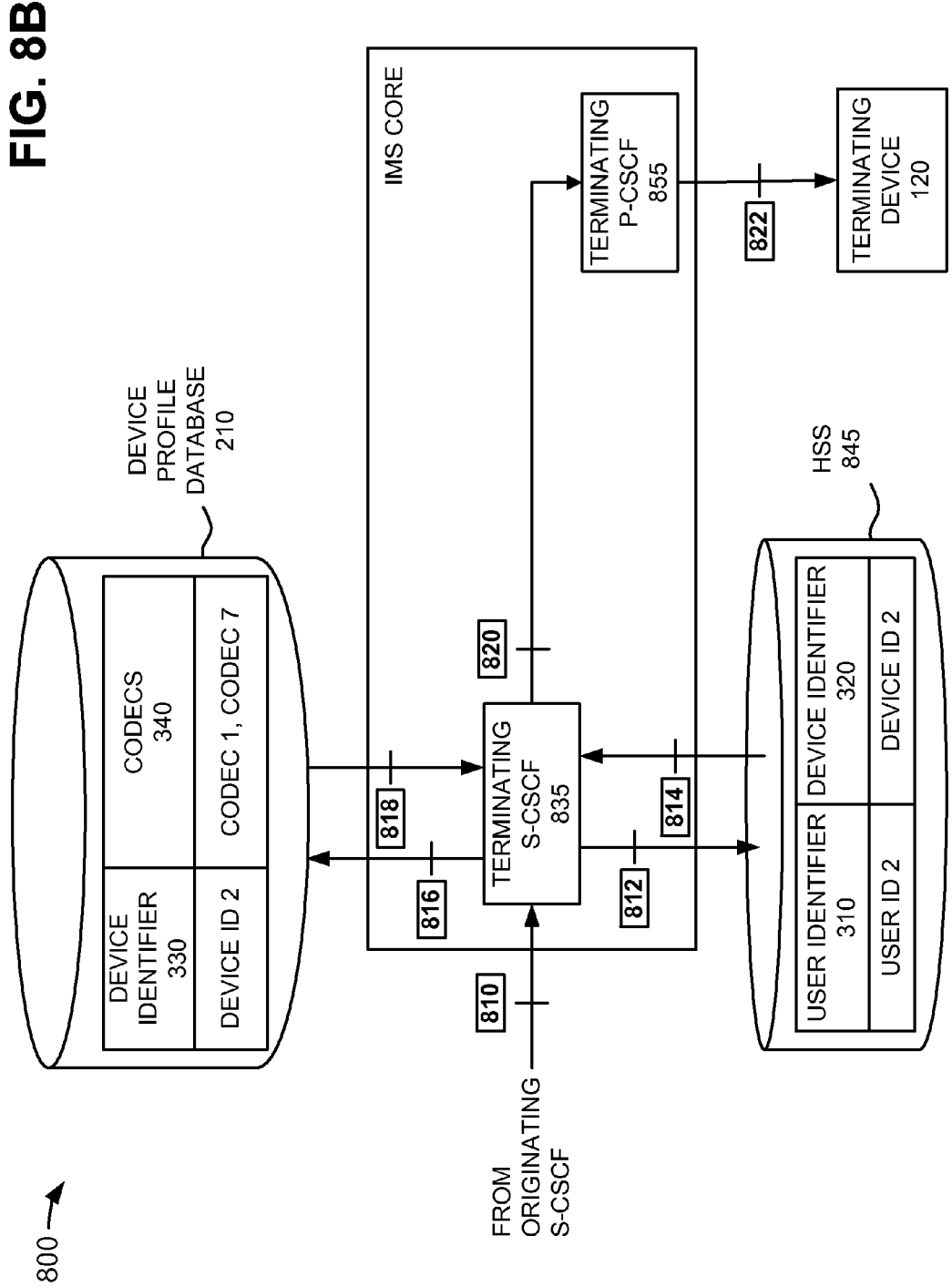

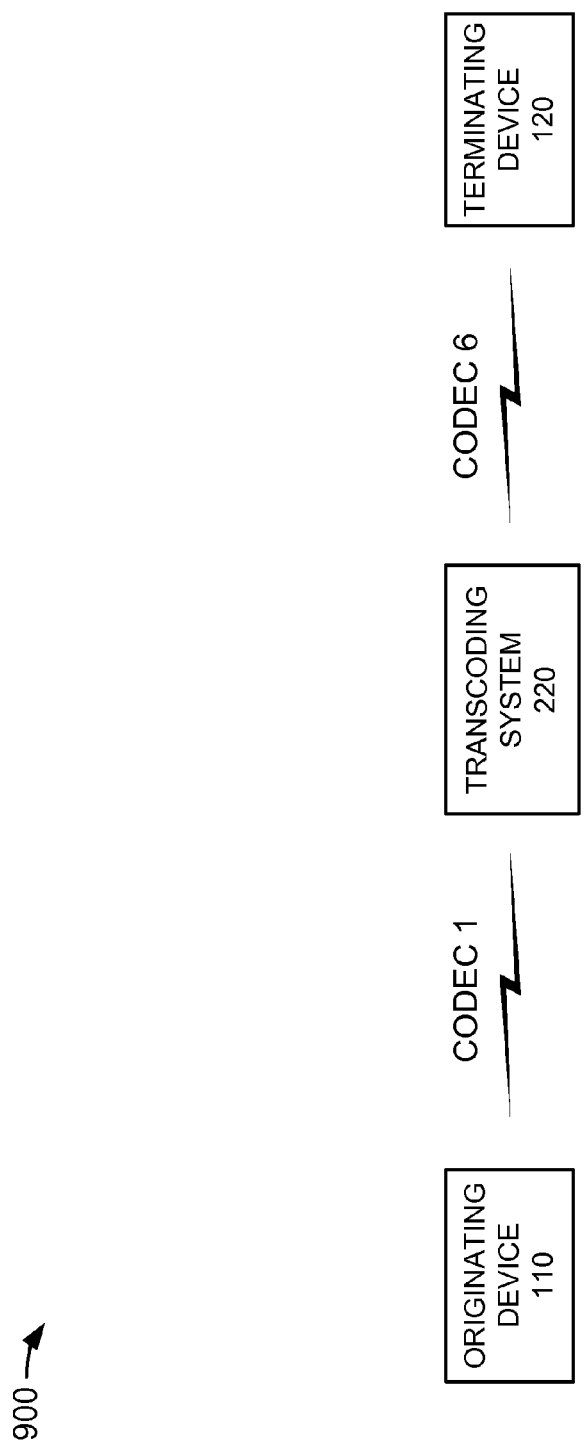

LOOK-AHEAD CAPABILITY DETERMINATION VIA DEVICE PROFILES

BACKGROUND INFORMATION

Telephone calls from one user device to another may require transcoding if the user devices are unable to negotiate a common media encoding format (codec). Thus, a network will need to know which codecs the originating device and the terminating device support. The network may identify the codecs supported by the originating device by examining the "offer" portion of the call request message sent by the originating device when the call is placed. Currently, the network determines the codecs supported by the terminating device through a trial-and-error process, where the network may attempt to establish a call to the terminating device using the codecs offered by the originating device and, if that fails, the network may re-attempt to establish the call using other codecs. If the terminating device accepts this modified offer, the network provides transcoding services so that the media is translated "on the fly" for the duration of the session, between the format used by the originating device and that used by the terminating device.

BRIEF DESCRIPTION OF THE DRAWINGS

FIG. 2 is an exemplary block diagram of a call processing system of FIG. 1;

FIG. 3A is an exemplary diagram of a location database of FIG. 2;

FIG. 4 illustrates an exemplary block diagram of a transcoding system and/or a call establishment system of FIG. 2;

FIG. 5 is an exemplary functional block diagram of the call establishment system of FIG. 2;

FIGS. 8A and 8B provide an example of the processing described in FIG. 7; and

FIGS. 9A-9C provide another example of the processing described in FIG. 7.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Embodiments described herein relate to systems and/or methods that may monitor the placing of calls from devices and log, when calls are placed, a list of codecs that the devices are willing to support. Thus, when a call is placed to one of these devices, systems and/or methods described herein may identify the codecs that the device is willing to support, prior to establishing the call to the device, and establish the call to the device using one of the identified codecs. Thus, unlike conventional techniques where the codecs that a device is willing to support are determined by trial-and-error and on a call-by-call basis, systems and/or methods described herein may identify an appropriate codec for establishing the call prior to establishing the call to the device.

While the description below focuses on identifying codecs for a call, the techniques described herein are equally applicable to other device capabilities that are advertised in an analogous manner as described herein.

Figure 1:
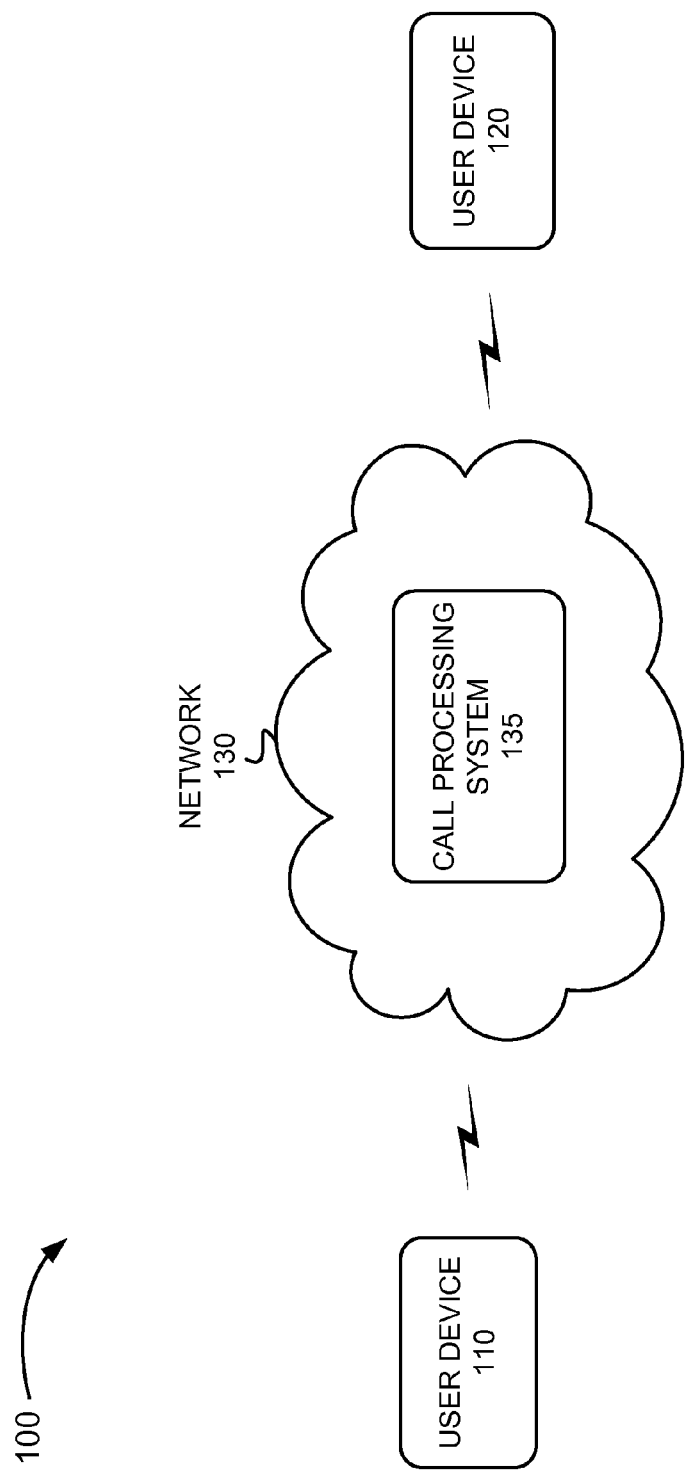
FIG. 1 is an exemplary environment in which systems and/or methods, consistent with exemplary embodiments, may be implemented.

FIG. 1 is an exemplary environment 100 in which systems and/or methods, consistent with exemplary embodiments, may be implemented. As illustrated, environment 100 may include a user device 110, a user device 120, and a network 130 interconnecting user devices 110 and 120.

User devices 110 and 120 may include communication devices, such as a communication device that is capable of initiating a call to another device and receiving a call from another device. For example, user devices 110 and 120 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), and/or other types of communication devices. User devices 110 and 120 may connect to network 130 via wired or wireless connections.

Network 130 may include one or more networks of any type, including, for example, a local area network (LAN); a wide area network (WAN); a metropolitan area network (MAN); a telephone network, such as the Public Switched Telephone Network (PSTN) or a Public Land Mobile Network (PLMN); a satellite network; an intranet; the Internet; an Internet Protocol Multimedia Subsystem (IMS) network; or a combination of networks. The PLMN(s) may further include a packet-switched network, such as, for example, a General Packet Radio Service (GPRS) network, a Cellular Digital Packet Data (CDPD) network, or a Mobile IP network.

As illustrated in FIG. 1, network 130 may include a call processing system 135. Call processing system 135 may include one or more network devices that process calls between user device 110 and user device 120. The processing may include, for example, facilitating the establishment of calls between user device 110 and user device 120, performing one or more functions during ongoing calls (such as performing transcoding), and terminating calls between user device 110 and user device 120.

The number of components illustrated in FIG. 1 is provided for simplicity. In practice, a typical environment could include more or fewer components than illustrated in FIG. 1. Also, in some embodiments, one or more of the components of environment 100 may perform one or more tasks described as being performed by one or more other components of environment 100.

FIG. 2 is an exemplary block diagram of call processing system 135. As illustrated, call processing system 135 may include a location database 200, a device profile database 210, a transcoding system 220, and a call establishment system 230.

Location database 200 may store information that relate user identifiers to device identifiers. For example, in one embodiment, location database 200 may include a group of entries, where each entry maps a particular user identifier to a particular device identifier. In those situations where network 130 includes an IMS, location database 200 may correspond, for example, to a Home Subscriber Server (HSS).

Device profile database 210 may store information identifying the capabilities of devices in environment 100, such as user devices 110 and 120. In one embodiment, the capabilities may include a list of codecs that devices are willing to support. Examples of codecs that may be used in voice communications include codecs defined by the International Telecommunication Union (ITU) standards (e.g., such as G.711), codecs defined by the Global System for Mobile communications (GSM) standards (e.g., such as Adaptive Multi-Rate (AMR)), etc. It will be appreciated that the codecs that a device is willing to support may be different than the codecs that the device is capable of supporting. For example, a device may be capable of supporting three different codecs. However, a user may disable the use of one of the codecs on the device. Thus, in this instance, the codecs that the device is willing to support may be less than the codecs that the device is capable of supporting.

Transcoding system 220 may include one or more devices that may transcode traffic between devices using different codecs. For example, if user device 110 uses the G.711 codec and user device 120 uses the AMR codec, transcoding system 220 may decode the G.711-formatted traffic from user device 110, re-encode the traffic in the AMR codec format, and forward the AMR-formatted traffic to user device 120. Transcoding system 220 may further decode the AMR-formatted traffic from user device 120, re-encode the traffic in the G.711 codec format, and forward the G.711-formatted traffic to user device 110.

Call establishment system 230 may include one or more devices that may establish a call between user device 110 and user device 120. In those situations where network 130 includes an IMS, call establishment system 230 may correspond, for example, to a Serving-Call Session Control Function (S-CSCF).

In one embodiment, call establishment system 230 may receive a call request message from an originating user device (such as user device 110), which is directed to a terminating user device (such as user device 120). The call request message may include information identifying the originating user (such as a user name or another type of identifier), information identifying the codecs that user device 110 is willing to support, and information identifying the terminating user (such as a user name or another type of identifier). In response to receiving the call request message, call establishment system 230 may parse the call request message to obtain the information identifying the terminating user. Call establishment system 230 may use the information identifying the terminating user to obtain (e.g., from location database 200) information identifying user device 120 (with which the terminating user is associated). Call establishment system 230 may use the information identifying user device 120 to obtain a list of codecs that user device 120 is willing to support, from device profile database 210. Call establishment system 230 may invoke or not invoke transcoding system 220 based on the list of codecs that user device 110 is willing to support and the list of codecs that user device 120 is willing to support. For example, if user device 110 and user device 120 support a particular codec, then that codec may be used for the call between user devices 110 and 120. If, on the other hand, user device 110 and user device 120 do not support a common codec, call establishment system 230 may route the call through transcoding system 220.

Although FIG. 2 illustrates an exemplary arrangement of call processing system 135, in other embodiments, call processing system 135 may include fewer, different, differently arranged, or additional components than those depicted in FIG. 2. Additionally, or alternatively, one or more components of call processing system 135 may perform one or more tasks described as being performed by one or more other components of call processing system 135.

FIG. 3A is an exemplary diagram of location database 200. While one database is described below, it will be appreciated that location database 200 may consist of multiple databases stored locally at call establishment system 230, or stored at one or more different and possibly remote locations. For example, in a situation where call processing system 135 includes multiple call establishment systems 230, each call establishment system 230 may be associated with a different location database 200 that may store information for those users supported by the particular call establishment system 230.

As illustrated, location database 210 may include a group of entries in the following exemplary fields: a user identifier field 310 and a device identifier field 320. User identifier field 310 may store information identifying a user in environment 100. In one embodiment, the information may include a sequence of characters that uniquely identifies the user. For example, the information may include a user name or another type of identifier. Device identifier field 320 may store information identifying a user device in environment 100 with which the user, identified in field 310, is associated. In one embodiment, the information may include a sequence of characters that uniquely identifies the user device. For example, the information may include a telephone number, a URI, an IP address, or another sequence of characters used to identify a user device for establishing a call.

Although FIG. 3A illustrates an exemplary arrangement of fields of location database 200, in other embodiments, location database 200 may include different, differently arranged, or additional fields than those depicted in FIG. 3A.

Figure 3B:
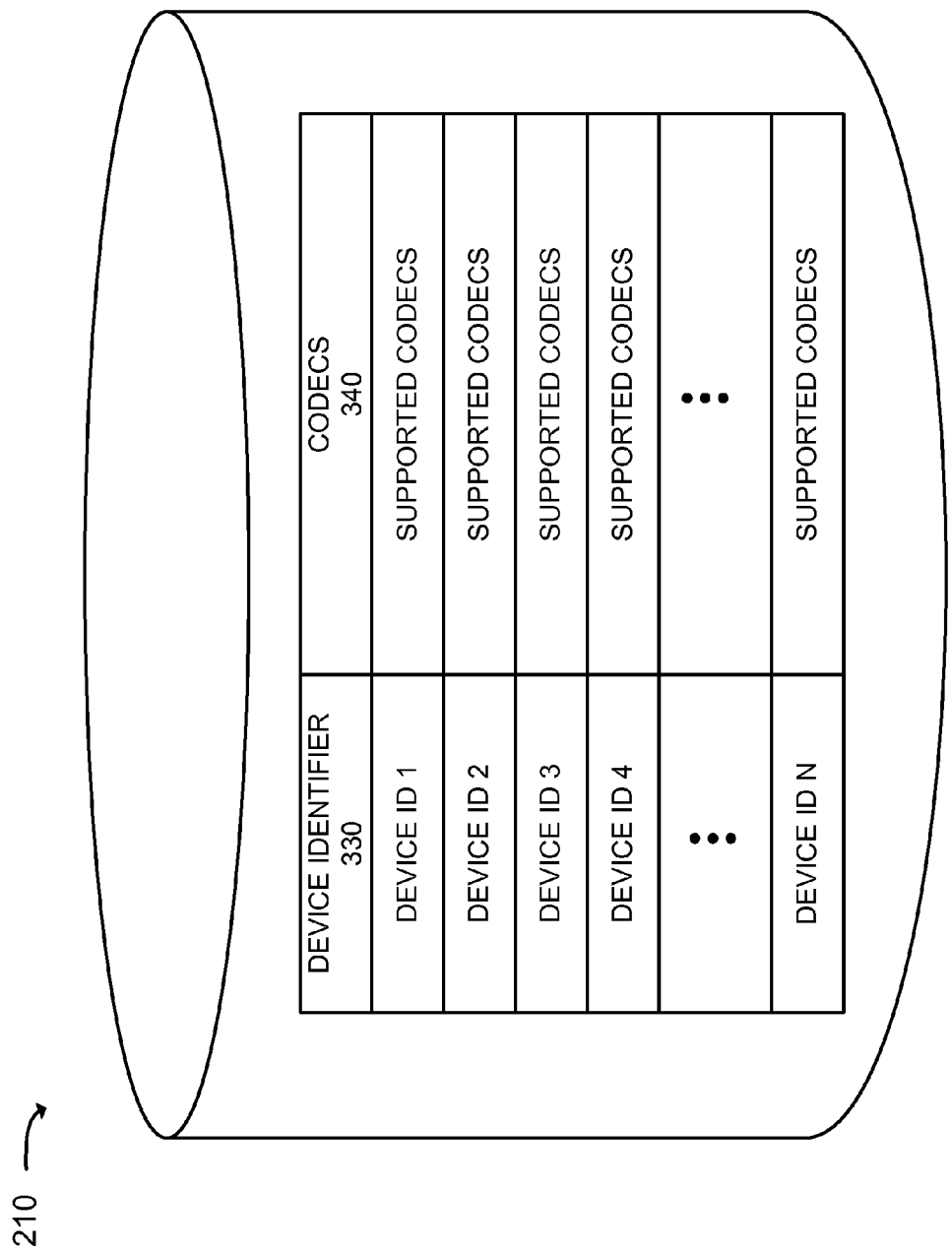
FIG. 3B is an exemplary diagram of a device profile database of FIG. 2.

FIG. 3B is an exemplary diagram of device profile database 210. While one database is described below, it will be appreciated that device profile database 210 may consist of multiple databases stored locally at call establishment system 230, or stored at one or more different and possibly remote locations. For example, in a situation where call processing system 135 includes multiple call establishment systems 230, each call establishment system 230 may be associated with a different device profile database 210 that may store device capabilities information for those devices supported by the particular call establishment system 230.

As illustrated, device profile database 210 may include a group of entries in the following exemplary fields: a device identifier field 330 and a codecs field 340. Device identifier field 330 may store information identifying a user device in environment 100. In one embodiment, the information may include a sequence of characters that uniquely identifies the user device. For example, the information may include a telephone number, a URI, an IP address, or another sequence of characters used to identify a user device for establishing a call. Codecs field 340 may store information identifying codecs that the user device, identified in device identifier field 330, is willing to support. In one embodiment, codecs field 340 may store information identifying all of the codecs that the user device is willing to support.

Although FIG. 3B illustrates an exemplary arrangement of fields of device profile database 210, in other embodiments, device profile database 210 may include different, differently arranged, or additional fields than those depicted in FIG. 3B. For example, in one embodiment, device profile database 210 may include an additional field that stores other capabilities information for user devices.

FIG. 4 illustrates an exemplary block diagram of transcoding system 220 and/or call establishment system 230. As illustrated, transcoding system 220/call establishment system 230 may include a bus 410, processing logic 420, a memory 430, and a communication interface 440. Transcoding system 220/call establishment system 230 may include other components (not shown) that aid in receiving, transmitting, and/or processing data. Moreover, other configurations are possible.

Bus 410 may permit communication among the components of transcoding system 220/call establishment system 230. Processing logic 420 may include one or more processors or microprocessors that interpret and execute instructions. Additionally or alternatively, processing logic 420 may be implemented as or include an application specific integrated circuit (ASIC), a field programmable gate array (FPGA), or the like. Memory 430 may include a random access memory (RAM) or another type of dynamic storage device that stores information and instructions for execution by processing logic 420, a read only memory (ROM) or another type of static storage device that stores static information and instructions for the processing logic 420, and/or some other type of magnetic or optical recording medium and its corresponding drive for storing information and/or instructions.

Communication interface 440 may include any transceiver-like mechanism that enables transcoding system 220/call establishment system 230 to communicate with other devices and/or systems. For example, communication interface 440 may include mechanisms for communicating with other components within environment 100.

As will be described in detail below, transcoding system 220/call establishment system 230 may perform call processing. Transcoding system 220/call establishment system 230 may perform these and other functions in response to processing logic 420 executing software instructions contained in a computer-readable medium, such as memory 430. A computer-readable medium may be defined as a physical or logical memory device. A logical memory device may include a space within a single physical memory device or spread across multiple physical memory devices. The software instructions may be read into memory 430 from another computer-readable medium or from another device via communication interface 440. The software instructions contained in memory 430 may cause processing logic 420 to perform processes that will be described later. Alternatively, hardwired circuitry may be used in place of or in combination with software instructions to implement processes consistent with the principles of the invention. Thus, systems and methods described herein are not limited to any specific combination of hardware circuitry and software.

FIG. 5 illustrates an exemplary functional block diagram of a portion of call establishment system 230 in an exemplary embodiment. In one embodiment, the functional blocks described in connection with FIG. 5 may be implemented via, for example, processing logic 420 executing instructions contained in memory 430. As illustrated, call establishment system 230 may include call processing component 510 and a profile creation component 520.

Call processing component 510 may receive call request messages from devices (e.g., Session Initiation Protocol (SIP) INVITE messages). Each call request message may include information identifying the originating user (the user initiating the call), the terminating user (the user to which the call is directed), and a list of codecs supported by the originating user device (the device used by the originating user to send the call request, which will be assumed to be user device 110). In this particular scenario, assume that the terminating user is a user associated with user device 120 and that the portion of call establishment system 230 illustrated in FIG. 5 serves the terminating user. Call processing component 510 may parse each message to identify the terminating user, and use this information to obtain information identifying a terminating user device (e.g., assumed to be user device 120). Call processing component 510 may then use the information identifying user device 120 to identify a list of codecs that user device 120 is willing to support. Call processing component 510 may attempt to establish a call to user device 120 based on the identified list of codecs.

Profile creation component 520 may receive information identifying codecs that user devices are willing to support and store that information, in association with information identifying the user devices, in device profile database 210. Profile creation component 520 may obtain the information identifying the codecs when calls are established from users being served by the particular call establishment system. For example, assume again, that the portion of call establishment system 230 illustrated in FIG. 5 serves the user associated with user device 120. In one embodiment, profile creation component 520 may receive a call request message from an originating device (assumed here to be user device 120), parse the message to obtain information identifying the user and the list of codecs that user device 120 is willing to support, use the information identifying the user to obtain information identifying user device 120 (e.g., from location database 200), and store the information identifying user device 120 and the list of codecs that user device 120 is willing to support in device profile database 210. In some embodiments, profile creation component 520 may obtain the list of codecs that a user device is willing to support in other ways. For example, when user device 120 is newly connected to network 130, information regarding the codecs that user device 120 is willing to support may not be known. If a call is unsuccessfully established to user device 120, call processing component 510 may use a rejection message, which may include a list of codecs that the user device is willing to support, from user device 120 to obtain the list of codecs that user device 120 is willing to support. If the list is not present in the rejection message, call processing system 510 may use a trial-and-error technique to identify a codec that user device 120 is able to support (e.g., where call processing component 510 may attempt to establish the call using a first codec and if the call establishment attempt is rejected, call processing component 510 may attempt to use another codec until an acceptable codec is identified). Once identified, profile creation component 520 may associate the acceptable codec with user device 120 in device profile database 210.

Although FIG. 5 illustrates an exemplary arrangement of call establishment system 230, in other embodiments, call establishment system 230 may include fewer, different, differently arranged, or additional functional components than those depicted in FIG. 5. Additionally, or alternatively, one or more functional components of call establishment system 230 may perform one or more tasks described as being performed by one or more other functional components of call establishment system 230.

Figure 6:
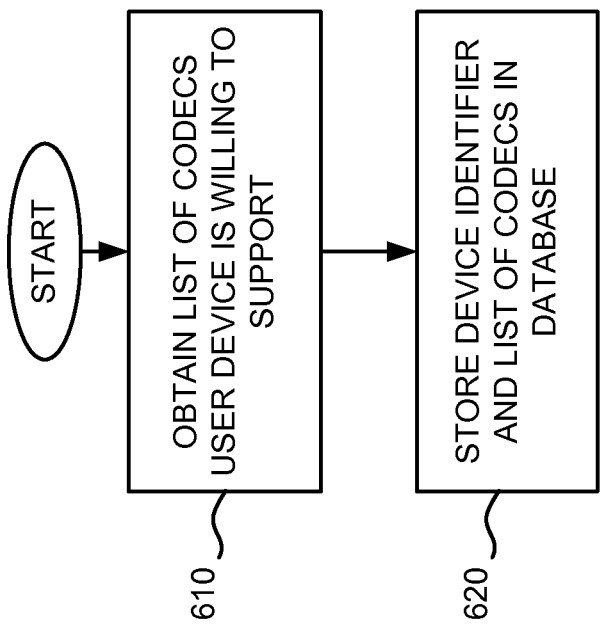
FIG. 6 is an exemplary flow chart for storing profiles in the device profile database of FIG. 2.

FIG. 6 is an exemplary flow chart for storing profiles in device profile database 210. The processing described in FIG. 6 may be performed by call establishment system 230 (e.g., profile creation component 520). In another embodiment, some or all of the processing described in FIG. 6 may be performed by one or more devices separate from or in combination with call establishment system 230.

Processing may begin with call establishment system 230 obtaining a list of codecs that a user device is willing to support (block 610). For example, call establishment system 230 may receive a call request message from a device, such as user device 120, for a terminating user (e.g., a user associated with user device 110). The call request message may include information identifying the terminating user, information identifying the originating user (e.g., the user associated with user device 120), and a list of codecs that the user device 120 is willing to support. Call establishment system 230 may parse the call request message to obtain the information identifying the originating user and use that information to obtain (e.g., from location database 200) information identifying user device 120. In this way, call establishment system 230 may obtain, for user device 120, the information identifying user device 120 and the information identifying the list of codecs that user device 120 is willing to support.

Alternatively, call establishment system 230 may obtain information identifying a codec that a user device is willing to support by attempting to establish a call to the user device. For example, as described above, if a call is unsuccessfully established to user device 120, call establishment system 230 may obtain the list of codecs that user device 120 is willing to support from a rejection message sent from user device 120, or may use, when the rejection message does not include the list of codecs, a trial-and-error technique to identify a codec that user device 120 is able to support (e.g., where call establishment system 230 may attempt to establish the call using a first codec and if the call establishment attempt is rejected, call establishment system 230 may attempt to use another codec until an acceptable codec is identified). In this way, call establishment system 230 may obtain information identifying a codec that user device 120 is willing to support.

Call establishment system 230 may store the information identifying the user device and the information identifying the codecs that the user device is willing to support (block 620). For example, call establishment system 230 may store the information identifying user device 120 in device identifier field 330 of device profile database 210. Call establishment system 230 may further store the information identifying the codecs that user device 120 is willing to support in codecs field 340 of device profile database 210.

Figure 7A:
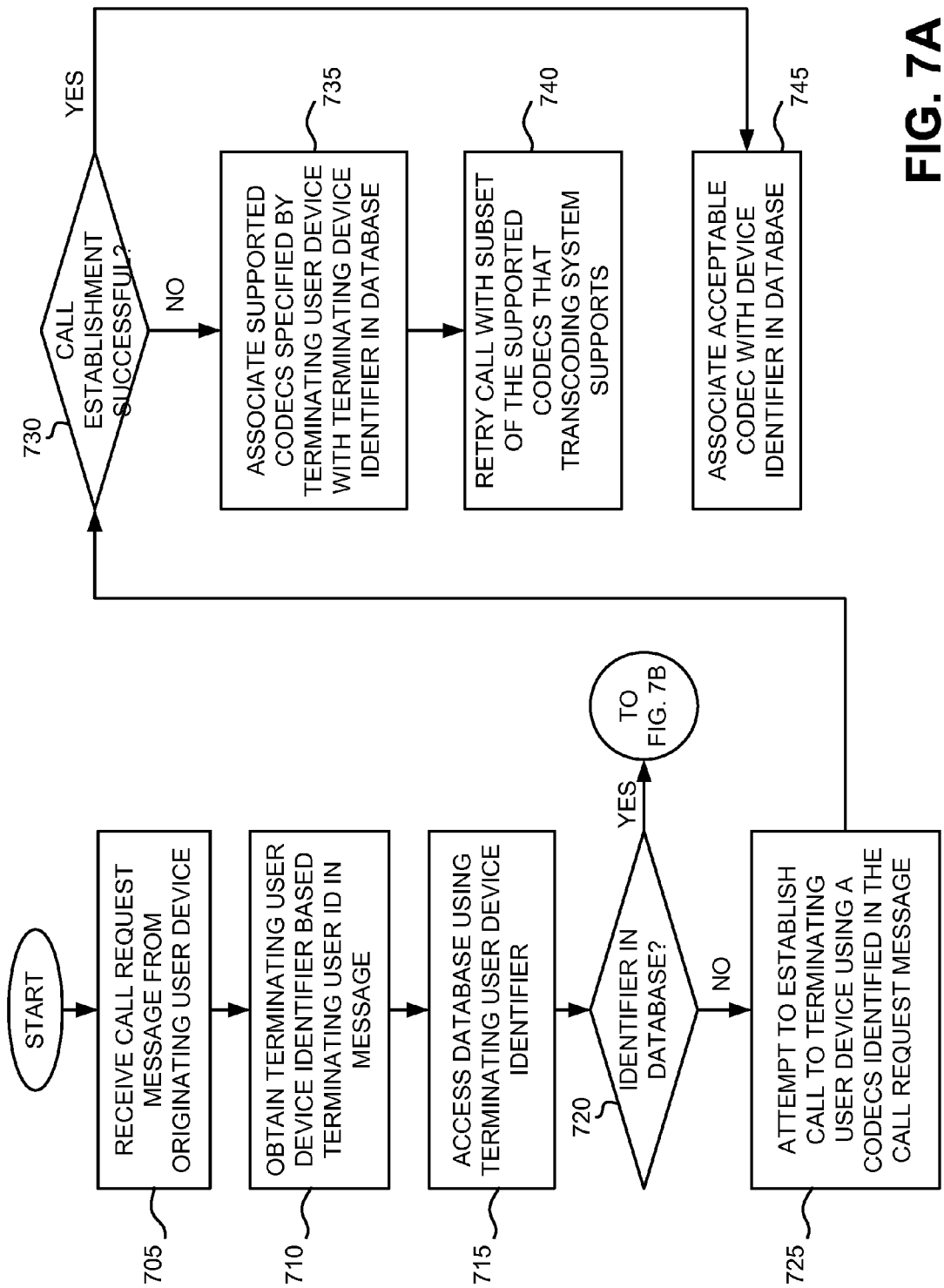
FIGS. 7A and 7B are an exemplary flow chart for processing a call according to an exemplary embodiment.
Figure 7B:
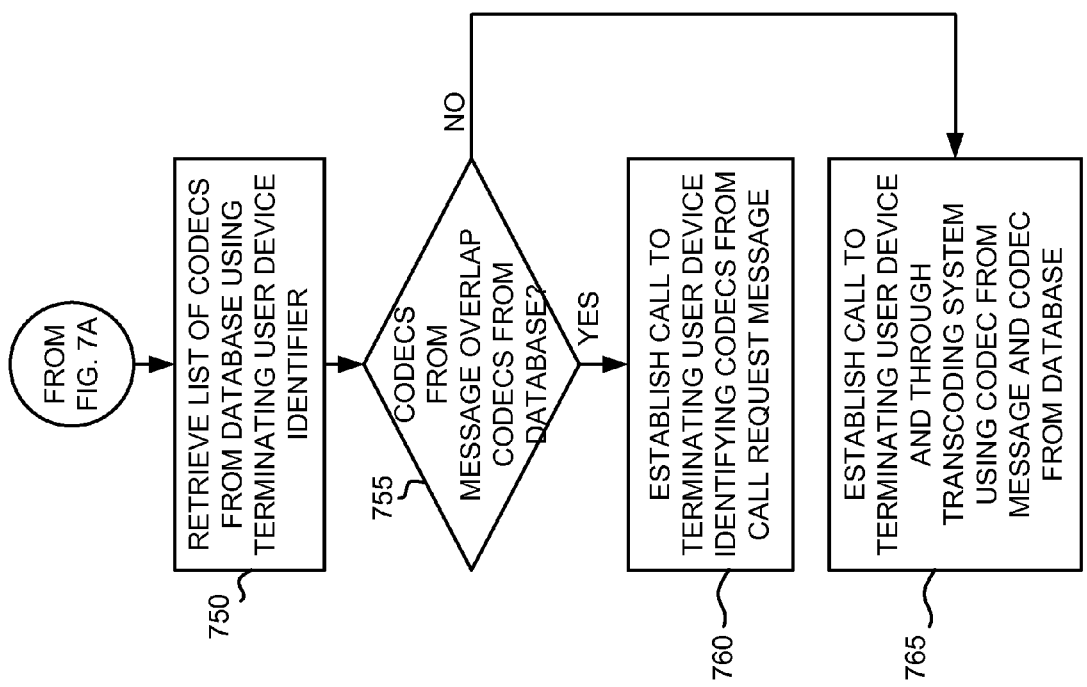

FIGS. 7A and 7B are an exemplary flow chart for processing a call according to an exemplary embodiment. The processing described in FIGS. 7A and 7B may be performed by call processing system 135. In another embodiment, some or all of the processing described in FIGS. 7A and 7B may be performed by one or more devices separate from or in combination with call processing system 135.

Processing may begin with call processing system 135 receiving a call request message from an originating user device (block 705, FIG. 7A). For example, a user of user device 110 may place a call to a terminating user, associated with user device 120, which causes user device 110 to transmit a call request message to network 130. The call request message may include information identifying the originating user, information identifying the codecs that user device 110 is willing to support, and information identifying the terminating user. Call processing system 135 (e.g., call establishment system 230 that serves the terminating user) may receive the call request message.

Call establishment system 230 may obtain an identifier for user device 120 based on the information identifying the terminating user, included in the call request message (block 710). For example, call establishment system 230 may parse the call request message to obtain an identifier for the terminating user. Call establishment system 230 may access location database 200, using the terminating user identifier, to obtain an identifier for user device 120.

Call establishment system 230 may access device profile database 210 using the identifier for user device 120 (block 715). For example, call establishment system 230 may look up the identifier of user device 120 in identifier field 330 of device profile database 210. Call establishment system 230 may determine whether the identifier of user device 120 is stored in device profile database 210 (block 720). For example, if the user device is new to environment 100, an identifier for the user device may not be stored in device profile database 210.

If call establishment system 230 determines that the identifier of user device 120 is not stored in device profile database 210 (block 720—NO), call establishment system 230 may attempt to establish the call to user device 120 using codecs from the call request message (block 725). In one implementation, the list of codecs in the call request message may be ordered, such that the codec that user device 110 prefers most is listed first, the codec that user device 110 prefers second most is listed second, etc.

Call establishment system 230 may determine whether the call establishment was successful (block 730). If the call establishment was unsuccessful (block 730—NO), call establishment system 230 may receive a rejection message from user device 120, which may include a list of codecs that user device 120 is willing to support (block 735). Call establishment system 230 may associate the supported codecs, specified by user device 120, with information identifying user device 120 in device profile database 210 (block 735). Call establishment system 230 may then establish the call to user device 120 using a subset of the supported codecs that transcoding system 220 supports (block 740).

If the call establishment was successful (block 730—YES), call establishment system 230 may associate the codec with the identifier of user device 120 in device profile database 210 (block 745). For example, call establishment system 230 may create an entry in device profile database 210 by storing the identifier of user device 120 in identifier field 330 and storing information identifying the codec in codec field 340.

If call establishment system 230 determines that the identifier of user device 120 is stored in device profile database 210 (block 720—YES), call establishment system 230 may retrieve the list of codecs, from device profile database 210, that user device 120 is willing to support (block 750, FIG. 7B). For example, call establishment system 230 may retrieve the information identifying the codecs that user device 120 is willing to support from codecs field 320 of device profile database 210.

Call establishment system 230 may determine whether codecs from the list of codecs identified in the call request message overlap codecs retrieved from device profile database 210 (block 755). For example, call establishment system 230 may compare each codec in the list of codecs from device profile database 210 to each codec identified in the call request message to determine if there is a match.

If call establishment system 230 determines that the codecs identified in the call request message overlap the codecs from device profile database 210 (block 755—YES), call establishment system 230 may establish the call to user device 120 (block 760). In one implementation, the call establishment message may include all of the codecs identified in the call request message. In this situation, user device 120 may select one of the codecs to use for the call. By proposing all of the codecs from the call request message and allowing user device 120 to select the codec to use for the call, call establishment system 230 may identify a codec for user device 120 that has not already been stored in device profile database 210. In another implementation, the call establishment message may include a subset of the codecs from the call request message (e.g., only those codecs that match codecs retrieved from device profile database 210).

If call establishment system 230 determines that the codecs from the call request message do not overlap the codecs retrieved from device profile database 210 (block 755—NO), call establishment system 230 may cause the call to be established with user device 120 through transcoding system 220, using a codec from the call request message and a codec from device profile database 210 (block 765). In this way, transcoding system 220 may decode traffic from user device 110 and re-encode the traffic in the codec format supported by user device 120 and decode traffic from user device 120 and re-encode the traffic in the codec format supported by user device 110.

Figure 8A:
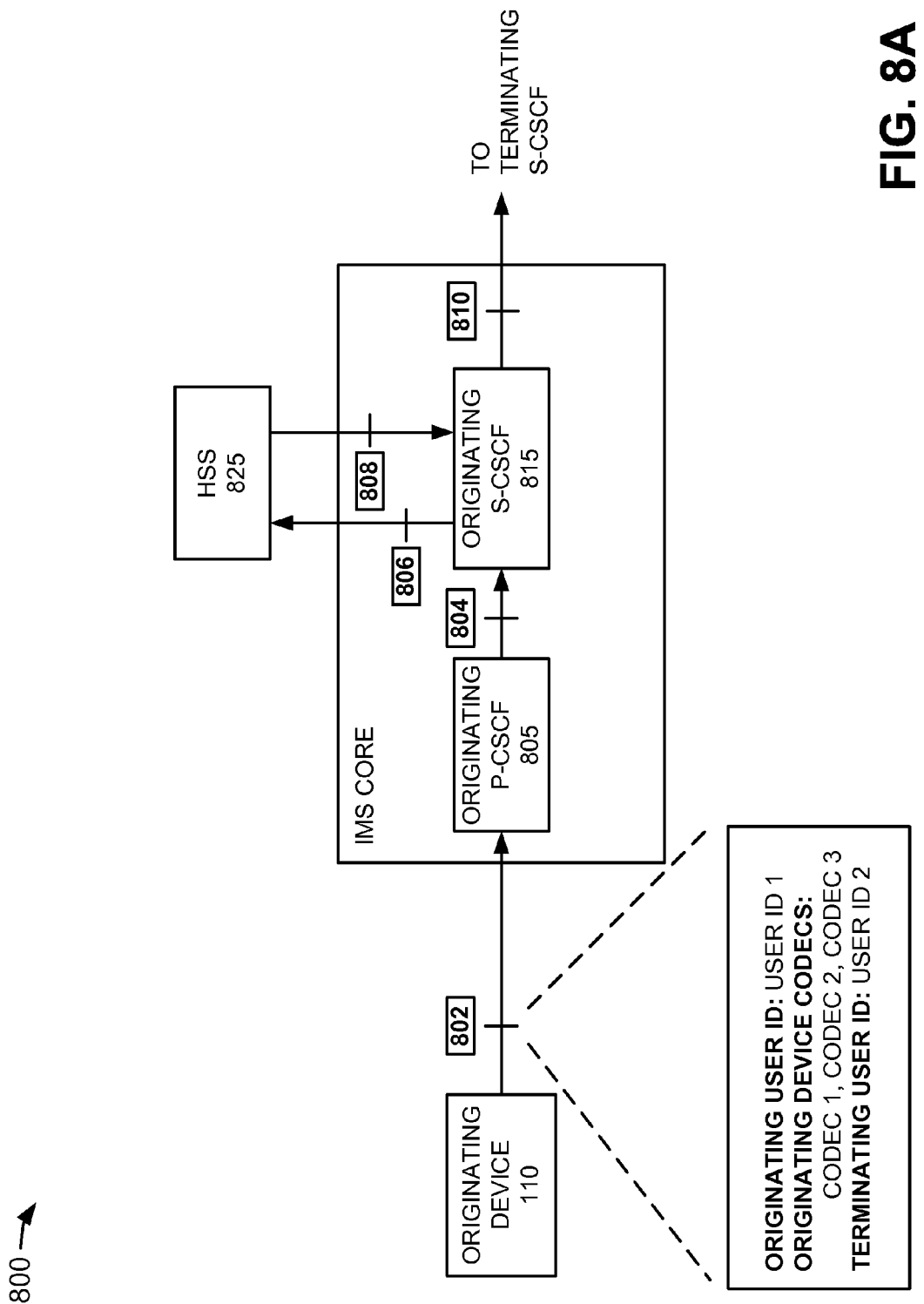

FIGS. 8A and 8B provide an example 800 of the processing described in FIGS. 7A and 7B. In example 800, assume that network 130 includes an IMS network and that a party (called an "originating user" hereinafter) at user device 110 (called "originating device 110" hereinafter) places a call to a party (called a "terminating user" hereinafter) at user device 120 (called "terminating device 120" hereinafter). In FIGS. 8A and 8B, call processing system 135 may include, for example, originating Proxy-Call Session Control Function (P-CSCF) 805, originating S-CSCF 815, HSS 825, terminating S-CSCF 835, HSS 845, device profile database 210, and terminating P-CSCF 855. In addition, in example 800, call establishment system 230 may, for example, correspond to terminating S-CSCF 835.

As illustrated in FIG. 8A, originating device 110 may transmit a call request message to the IMS network, which may be received by an originating P-CSCF 805 (block 802). Assume that the call request message includes the following information: originating user identifier ID 1; originating device codecs CODEC 1, CODEC 2, CODEC 3; and destination user identifier ID 2. Originating P-CSCF 805 may forward the call request message to an originating S-CSCF 815 (block 804). Originating S-CSCF 815 may perform one or more originating services based, for example, on the originating user identifier ID 1. For example, originating S-CSCF 815 may determine whether the originating user at originating device 110 is permitted to place a call to the terminating user. Assuming that the originating user is permitted to place a call to the terminating user, originating S-CSCF 815 may determine a terminating S-CSCF with which terminating user is registered. To do so, originating S-CSCF 815 may access HSS 825 (block 806), which associates users with the S-CSCFs with which the users are registered. Thus, HSS 825 may return the identity of the appropriate terminating S-CSCF to originating S-CSCF 815 (block 808). Originating S-CSCF 815 may then route the call request message through the network to the appropriate terminating S-CSCF 835, as illustrated in FIGS. 8A and 8B (block 810).

Referring to FIG. 8B, terminating S-CSCF 835 may receive the call request message (block 810). Terminating S-CSCF 835 may perform one or more terminating services based, for example, on the terminating user identifier ID 2. For example, terminating S-CSCF 835 may determine whether the terminating user is permitted to receive a call from the originating user. Assuming that the terminating user is permitted to receive a call from the originating user, terminating S-CSCF 835 may parse the call request message to obtain terminating user identifier ID 2 and use user identifier ID 2 to access HSS 845, to obtain an identifier for terminating device 120 (block 812). Assume, as illustrated in FIG. 8B, that HSS 845 includes an entry for user identifier ID 2 and that user identifier ID 2 is associated with device identifier ID 2. Thus, terminating S-CSCF 835 may retrieve device identifier ID 2 from HSS 845 (block 814). Terminating S-CSCF 835 may use device identifier ID 2 to access device profile database 210 (block 816). Assume, as illustrated in FIG. 8B, that device profile database 210 includes an entry for device identifier ID 2 and that device identifier ID 2 is associated with the following codecs: CODEC 1 and CODEC 7. Terminating S-CSCF 835 may retrieve the list of codecs from device profile database 210 (block 818). Terminating S-CSCF 835 may compare the list of codecs that terminating device 120 is willing to support to the list of codecs that originating device 110 is willing to support, from the call request message, to determine if there are overlapping codecs. In example 800, assume that terminating S-CSCF 835 determines that terminating device 120 and originating device 110 support the CODEC 1 codec. Therefore, terminating S-CSCF 835 may route the call request message to terminating P-CSCF 855 (block 820) and include, in this message, all of the codecs identified by in the original call request message from user device 110 (i.e., CODEC 1, CODEC 2, and CODEC 3). Terminating P-CSCF 855 may route the call request message to terminating device 120 (block 822), causing, for example, terminating device 120 to ring. In this way, a call may be established between originating device 110 and terminating device 120.

Figure 9A:
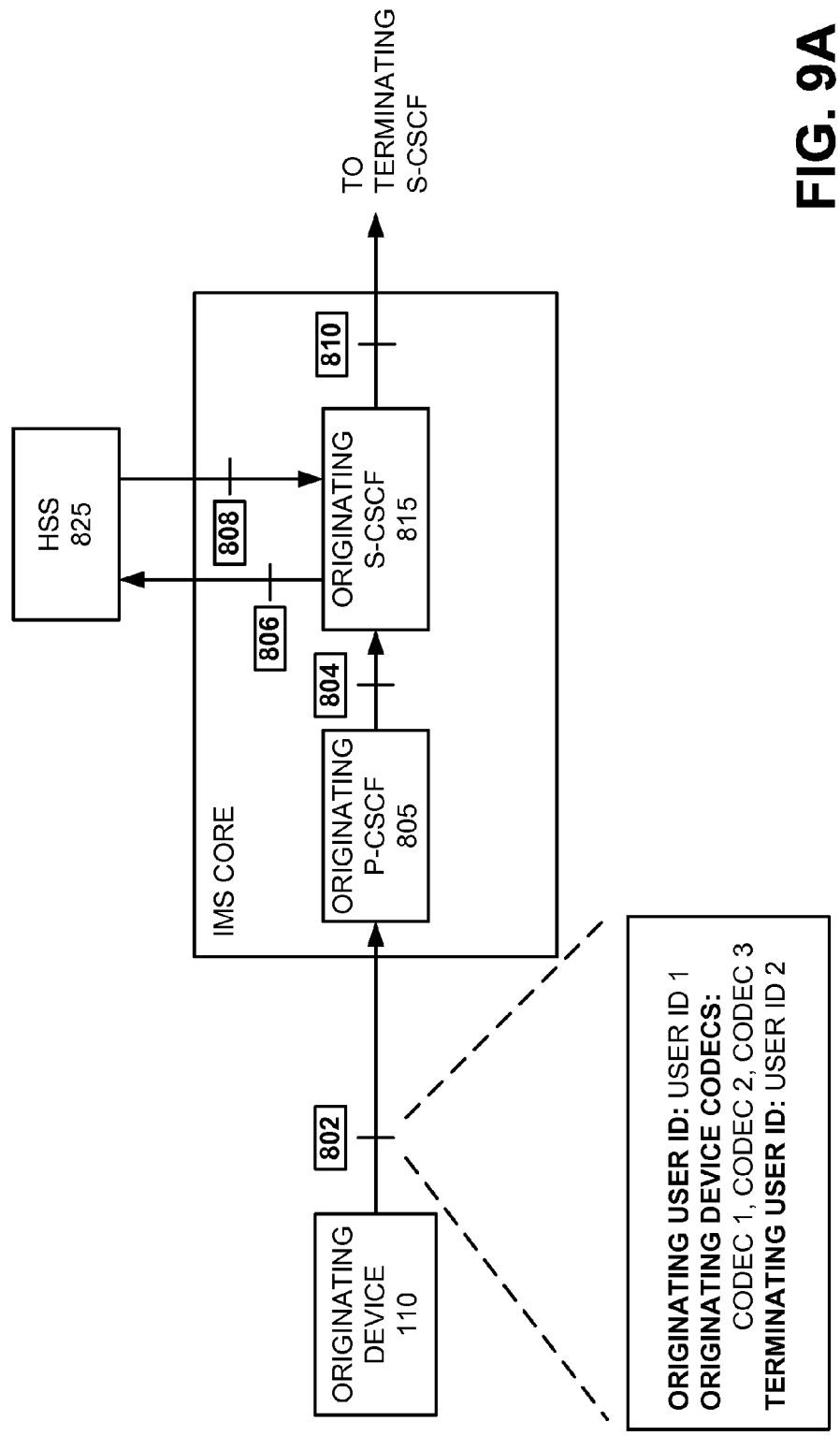
Figure 9B:
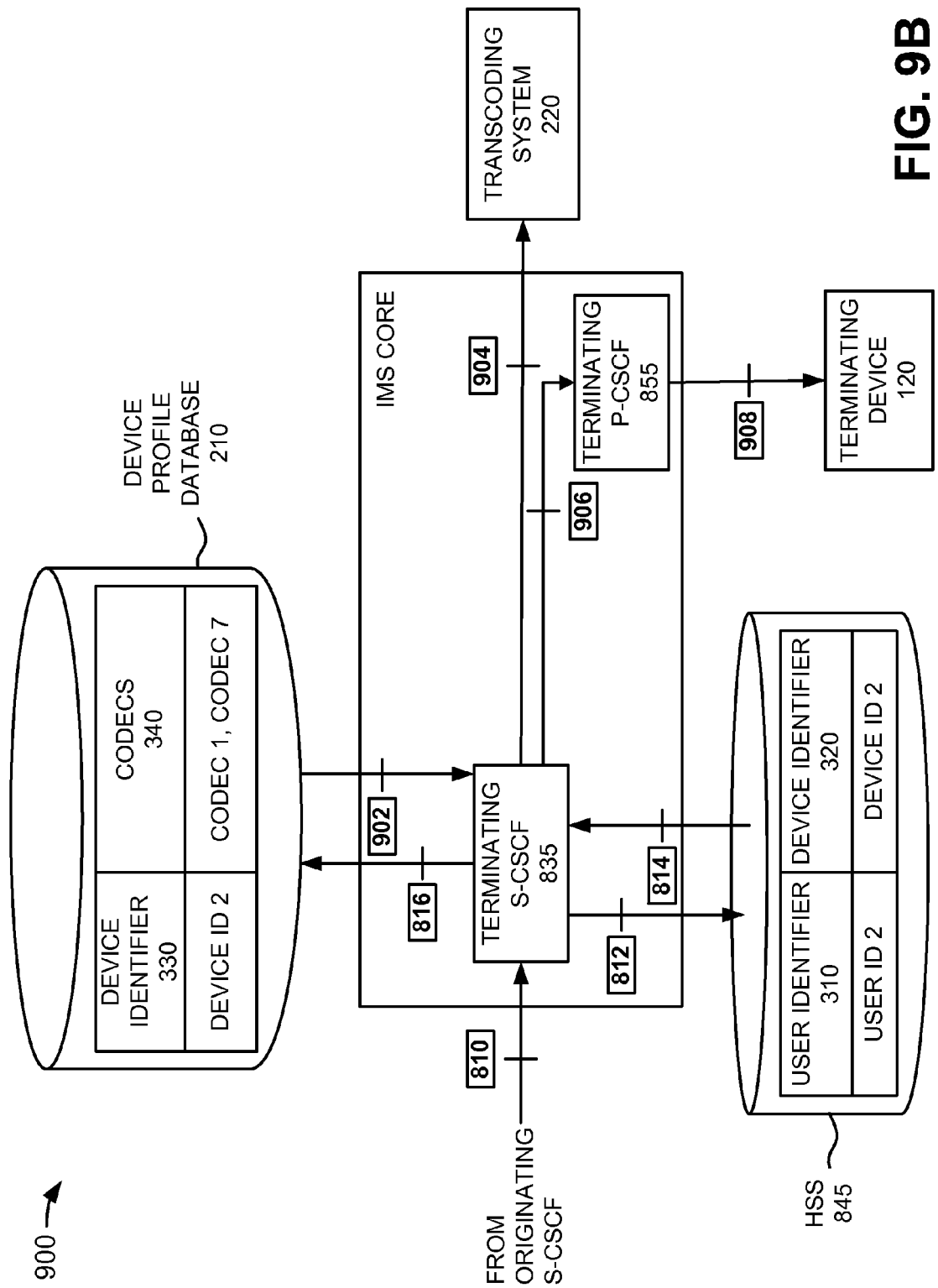

FIGS. 9A-9C provide another example 900 of the processing described in FIGS. 7A and 7B. In example 900, assume again that network 130 includes an IMS network and that a party (called an "originating user" hereinafter) at user device 110 (called "originating device 110" hereinafter) places a call to a party (called a "terminating user" hereinafter) at user device 120 (called "terminating device 120" hereinafter). In addition, in FIGS. 9A-9C, call processing system 135 may include, for example, originating P-CSCF 805, originating S-CSCF 815, HSS 825, terminating S-CSCF 835, HSS 845, device profile database 210, terminating P-CSCF 855, and transcoding system 220. In addition, in example 900, call establishment system 230 may, for example, correspond to terminating S-CSCF 835.

Assume, as illustrated in FIG. 9A, that originating device 110 transmits a call request message to the IMS network and this message is processed in the same manner as described above with respect to FIG. 8A (blocks 802-810). Referring to FIG. 9B, terminating S-CSCF 835 may receive the call request message (block 810). Terminating S-CSCF 835 may perform one or more terminating services based, for example, on the terminating user identifier ID 2. For example, terminating S-CSCF 835 may determine whether the terminating user is permitted to receive a call from originating device 110. Assuming that the terminating user is permitted to receive a call from originating device 110, terminating S-CSCF 835 may parse the call request message to obtain terminating user identifier ID 2 and use user identifier ID 2 to access HSS 845, to obtain an identifier for terminating device 120 (block 812). Assume, as illustrated in FIG. 9B, that HSS 845 includes an entry for user identifier ID 2 and that indicates that user identifier ID 2 is associated with device identifier ID 2. Thus, terminating S-CSCF 835 may retrieve device identifier ID 2 from HSS 845 (block 814). Terminating S-CSCF 835 may use device identifier ID 2 to access device profile database 210 (block 816). Assume, as illustrated in FIG. 9B, that device profile database 210 includes an entry for identifier ID 2 and that identifier ID 2 is associated with the following codecs: CODEC 6 and CODEC 7. Terminating S-CSCF 835 may retrieve the list of codecs from device profile database 210 (block 902). Terminating S-CSCF 835 may compare the list of codecs that terminating device 120 is willing to support to the list of codecs that originating device 110 is willing to support, from the call request message, to determine if there is a match. In example 900, assume that terminating S-CSCF 835 determines that terminating device 120 and originating device 110 do not support a common codec. Therefore, terminating S-CSCF 835 may invoke transcoding system 220. Terminating S-CSCF 835 may select a codec that originating device 110 is willing to support (e.g., CODEC 1) and a codec that terminating device 120 is willing to support (e.g., CODEC 6). Terminating S-CSCF 835 may transmit a signaling message to transcoding system 220, instructing transcoding system 220 to reserve capacity to translate one voice call between the CODEC 1 and CODEC 6 (block 904). Terminating S-CSCF 835 may then send a modified call request message to terminating device 120 through P-CSCF 855 (blocks 906 and 908). The modified call request message may include an additional codec that the network knows terminating device 120 is willing to support. In addition, the modified call request message may include an address associated with transcoding system 220. When the call is accepted at terminating device 120, the address may cause terminating device 120 to send traffic to transcoding system 220, which decodes the traffic from the CODEC 6 format, re-encodes the traffic in the CODEC 1 format, and forwards the traffic to originating device 110, as illustrated in FIG. 9C. In addition, transcoding system 220 may decode traffic from originating device 110 from the CODEC 1 format, re-encode the traffic in the CODEC 6 format, and forward the traffic to terminating device 120. In this way, a call may be established between originating device 110 and terminating device 120.

The foregoing description of embodiments provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6, 7A, and 7B, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by a Serving-Call Session Control Function (S-CSCF) device and in a codecs storage component stored by the S-CSCF device, information identifying a first device in association with a first list of codecs that the first device supports,
   the codecs storage component including:
      a first field to store the information identifying the first device, and
      a second field to store the first list of codecs that is associated with
   the first device that is identified in the first field;
   receiving, by the S-CSCF device and from a second device, a call request message to establish a call after storing the first list of codecs in the codecs storage component,
      the call request message including information identifying a user to whom the call is directed, and
      the user being associated with the first device;
   obtaining, by the S-CSCF device and based on the information identifying the user, the information identifying the first device;
   determining, by the S-CSCF device, that the information identifying the first device is stored in the codecs storage component;
   retrieving, by the S-CSCF device and based on determining that the information identifying the first device is stored in the codecs storage component, the first list of codecs from the codecs storage component;
   identifying, by the S-CSCF device, a particular codec in the first list of codecs to be used to establish the call to the first device; and
   establishing, by the S-CSCF device and after identifying the particular codec, the call to the first device by using the particular codec.

2. The method of claim 1, further comprising:
   associating, in the codecs storage component, identifiers of devices with lists of codecs that the devices support,
      the devices including the first device,
      the identifiers including the information identifying the first device, and
      the lists of codecs including the first list of codecs.

3. The method of claim 1,
   where the call request message further includes a second list of codecs that the second device supports,
   where the method further comprises:
      determining that one or more codecs in the second list of codecs are identified in the first list of codecs, and
   where establishing the call includes:
      establishing the call by using, as the particular codec, one of the one or more codecs.

4. The method of claim 1,
   where the call request message further includes a second list of codecs that the second device supports,
   where the method further comprises:
      determining that the second list of codecs does not identify any codecs that are identified in the first list of codecs, and
   where establishing the call includes:
      establishing the call via a transcoding system by using the particular codec that is identified in the first list of codecs and a different codec that is identified in the second list of codecs.

5. The method of claim 1, where obtaining the information identifying the first device includes:
   determining that the user is permitted to receive the call from a different user associated with the second device, and obtaining the information identifying the first device after determining that the user is permitted to receive the call from the different user associated with the second device.

6. The method of claim 1, where establishing the call to the first device includes:
determining that the second device does not support any codec from the first list of codecs,
selecting a different codec that the second device supports based on the call request message, and
transmitting a message to a transcoding system that instructs the transcoding system to reserve capacity to translate the call between the different codec and the particular codec from the first list of codecs, and
transmitting a modified call request message to the first device,
the modified call request message including the particular codec from the first list of codecs and an address associated with the transcoding system, and
the transcoding system being to decode traffic from the second device and to forward the traffic to the first device.

7. A system comprising:
a Serving-Call Session Control Function (S-CSCF) device to:
store, in a codecs storage component stored by the S-CSCF device, information identifying a first device in association with a first list of codecs that the first device supports,
the codecs storage component including:
a first field to store the information identifying the first device, and
a second field to store the first list of codecs,
receive, from a second device, a call request message for a call directed to the first device after storing the first list of codecs,
determine, based on the call request message, that the information identifying the first device is stored in the codecs storage component;
obtain, based on determining that the information identifying the first device is stored in the codecs storage component, the first list of codecs from the codecs storage component,
identify a particular codec in the first list of codecs to be used to establish the call to the first device, and
establish the call to the first device by using the particular codec.

8. The system of claim 7,
where the call request message includes a second list of codecs that the second device supports,
where the S-CSCF device is further to:
determine that the second list of codecs identifies one or more codecs that are identified in the first list of codecs, and
where, when establishing the call, the S-CSCF device is to:
establish the call by using, as the particular codec, one of the one or more codecs.

9. The system of claim 7,
where the call request message includes a second list of codecs that the second device supports,
where the S-CSCF device is further to:
determine whether the second list of codecs overlaps with the first list of codecs, and
where, when establishing the call, the S-CSCF device is to:
invoke a transcoding system for the call when the second list of codecs does not overlap with the first list of codecs.

10. The system of claim of 7,
where the call request message includes information identifying a user, and
where the S-CSCF device is further to:
determine that the user is associated with the first device before determining that the information identifying the first device is stored in the codecs storage component.

11. The system of claim of 7, where, when establishing the call, the S-CSCF device is to:
transmit a message to a transcoding system that instructs the transcoding system to reserve capacity to translate the call between the particular codec and another codec that is supported by the second device,
the other codec being different from any codec in the first list of codecs.

12. A method comprising:
obtaining, by a Serving-Call Session Control Function (S-CSCF) device, first information identifying a first device and second information identifying one or more codecs that the first device supports;
storing, by the S-CSCF device and in a codecs storage component stored by the S-CSCF device, the first information identifying the first device in association with the second information identifying the one or more codecs that the first device supports,
the codecs storage component including:
a first field to store the first information identifying the first device, and
a second field to store the second information identifying the one or more codecs;
receiving, by the S-CSCF device and from a second device, a request to establish a call to the first device after storing the first information identifying the one or more codecs in the codecs storage component;
determining, by the S-CSCF device, that the first information identifying the first device is stored in the codecs storage component;
retrieving, by the S-CSCF device and from the codecs storage component, the second information identifying the one or more codecs that the first device supports based on determining the first information identifying the first device is stored in the codecs storage component;
identifying, by the S-CSCF device, a particular codec of the one or more codecs to be used to establish the call to the first device; and
establishing, by the S-CSCF device and after identifying the particular codec, the call to the first device by using the particular codec.

13. The method of claim 12, where obtaining the first information identifying the first device and the second information identifying the one or more codecs includes:
receiving a message from the first device,
the message including third information identifying a user associated with the first device,
retrieving, based on the third information identifying the user, the first information identifying the first device, and
retrieving, based on the first information identifying the first device, the second information identifying the one or more codecs that the first device supports.

14. The method of claim 12, where identifying the particular code includes:
determining that one or more codecs supported by the second device overlap with the one or more codecs that the first device supports, and identifying the particular codec that is one of the one or more codecs supported by the second device and one of the one or more codes that the first device supports.

15. The method of claim 12, where establishing the call includes:
   determining that one or more codecs supported by the second device do not overlap with the one or more codecs that the first device supports, and
   invoking a transcoding system to establish the call after determining that the one or more codecs supported by the second device do not overlap with the one or more codecs that the first device supports.

16. The method of claim 15, where invoking the transcoding system includes:
   modifying the request to include an address associated with the transcoding system, and
   transmitting the modified request to the first device.

17. A non-transitory computer-readable medium storing instructions, the instructions comprising:
   one or more instructions that, when executed by at least one processor of a Serving-Call Session Control Function (S-CSCF) device, cause the at least one processor to:
      obtain first information identifying a first device and second information identifying one or more codecs that the first device supports;
      store, in a codecs storage component stored by the S-CSCF device, the first information identifying the first device in association with the second information identifying the one or more codecs,
         the codecs storage component including:
            a first field to store the first information identifying the first device, and
            a second field to store the second information identifying the one or more codecs;
      receive, from a second device, a request to establish a call to the first device after storing the second information identifying the one or more codecs;
      determine, based on the request, that the first information identifying the first device is stored in the codecs storage component;
      retrieve, from the codecs storage component, the second information identifying the one or more codecs based on determining that the first information identifying the first device is stored in the codecs storage component;
      identify a particular codec of the one or more codecs to be used to establish the call to the first device; and
      establish the call to the first device by using the particular codec after identifying the particular codec.

18. The non-transitory computer-readable medium of claim 17,
   where the one or more instructions to obtain the first information identifying the first device and the second information identifying the one or more codecs that the first device supports include:
      one or more instructions that, when executed by the at least one processor, cause the at least one processor to:
         receive a message from the first device,
            the message including third information identifying a user associated with the first device and the second information identifying the one or more codecs that the first device supports, and
         obtain, based on the third information identifying the user, the first information identifying the first device.

19. The non-transitory computer-readable medium of claim 17,
   where the one or more instructions to obtain the first information identifying the first device and the second information identifying the one or more codecs that the first device-supports include:
      one or more instructions that, when executed by the at least one processor, cause the at least one processor to:
         receive a rejection message from the first device, and
         obtain information identifying at least one codec, of the one or more codecs that the first device supports, from the rejection message.

20. The non-transitory computer-readable medium of claim 17,
   where the one or more instructions to establish the call include:
      one or more instructions that, when executed by the at least one processor, cause the at least one processor to:
         determine that one or more codecs supported by the second device overlap with the one or more codecs that the first device supports, and
         establish the call by using the particular codec that is one of the one or more codecs supported by the second device and overlaps with one of the one or more codecs supported by the first device.

21. The non-transitory computer-readable medium of claim 17,
   where the one or more instructions to establish the call include:
      one or more instructions that, when executed by the at least one processor, cause the at least one processor to:
         determine that one or more codecs supported by the second device do not overlap with the one or more codecs that the first device supports, and
         invoke a transcoding system to establish the call after determining that the one or more codecs supported by the second device do not overlap with the one or more codecs that the first device supports.

* * * * *